United States Patent
Brown et al.

(10) Patent No.: US 12,273,235 B2
(45) Date of Patent: Apr. 8, 2025

(54) PARAMETERIZED DISTRIBUTED INTELLIGENCE AGENTS

(71) Applicant: Itron, Inc., Liberty Lake, WA (US)

(72) Inventors: Scott Dale Brown, Raleigh, NC (US); Andrew Keats, Seneca, SC (US); Jason Estes, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 539 days.

(21) Appl. No.: 17/213,149

(22) Filed: Mar. 25, 2021

(65) Prior Publication Data
US 2022/0311663 A1    Sep. 29, 2022

(51) Int. Cl.
*H04L 41/0813* (2022.01)
*G06N 20/00* (2019.01)
*G16Y 10/35* (2020.01)
*G16Y 40/10* (2020.01)

(52) U.S. Cl.
CPC ......... *H04L 41/0813* (2013.01); *G06N 20/00* (2019.01); *G16Y 10/35* (2020.01); *G16Y 40/10* (2020.01)

(58) Field of Classification Search
CPC .... H04L 41/0813; G06N 20/00; G16Y 10/35; G16Y 40/10
See application file for complete search history.

(56) References Cited

U.S. PATENT DOCUMENTS

| | | | |
|---|---|---|---|
| 8,779,921 B1* | 7/2014 | Curtiss | G08B 25/009 340/541 |
| 11,544,577 B1* | 1/2023 | Nookula | G06N 5/02 |
| 2015/0134954 A1* | 5/2015 | Walley | H04L 41/0813 713/168 |
| 2018/0081972 A1* | 3/2018 | Mohanbabu | H04L 63/0876 |
| 2018/0123820 A1* | 5/2018 | Kim | H04L 12/2809 |
| 2020/0209858 A1* | 7/2020 | Trofymov | G06N 20/00 |
| 2021/0003682 A1* | 1/2021 | Braley | G06N 3/08 |
| 2021/0125083 A1* | 4/2021 | Ogawa | G06N 20/00 |
| 2022/0407945 A1* | 12/2022 | Schoenborn | H04L 67/12 |

* cited by examiner

*Primary Examiner* — Nam T Tran
(74) *Attorney, Agent, or Firm* — Lee & Hayes, P.C.

(57) ABSTRACT

An agent, of a distributed intelligence application, generates feature data for a feature. A baseline configuration of parameters is processed, associated with the distributed intelligence application, to determine a first set of parameters. The baseline configuration of parameters and a modified configuration of parameters are processed to determine a second set of parameters. The modified configuration is associated with the distributed intelligence application and indicates a difference from the baseline configuration. A snapshot of dynamic data is processed according to an algorithm using the first set of parameters to determine a first result and using the second set of parameters to determine a second result. The first result and the second result are each provided with a respective indication of the configuration used to generate the result.

20 Claims, 9 Drawing Sheets

```
<diConfigParameters feature-name="High Impedance Detection" feature-id="5052B256"
    <Feature-id="5052B256" version = "1.0">
        <configKey="1">
            <parameter name="ZThreshold" value="250" />
            <parameter name="EventCount1" value="1" />
            <parameter name="EventTimeoutMins" value="180" />
            <parameter name="EventCount2" value="10" />
            <parameter name="ResetWatermark" value="0.75" />
        </configKey>
        <configKey="2">
            <parameter name="ZGradualTau" value="4" />
            <parameter name="ZThresGradual" value="0.5" />
            <parameter name="LZStoreIntervalSec" value="86400" />
            <parameter name="ResetWatermark" value="0.9" />
        </configKey>
    </Feature-id>
</diConfigParameters>
```

PARAMETERIZED DISTRIBUTED INTELLIGENCE AGENTS

BACKGROUND

An internet of things (IoT) endpoint, such as one that includes metrology for measuring electricity usage, may include one or more agents that apply various algorithms to data generated by the endpoint, such as by the use of sensors at the endpoint. For example, a distributed intelligence (DI) application may be cloud-hosted, and the one or more agents may be components of the DI application resident on an IoT endpoint. For example, the data generated by the IoT endpoint may include electricity usage data or data indicative of electricity grid conditions, such as voltage. The data generated by the IoT endpoint may include data received by the IoT endpoint from a source external to the IoT endpoint. In another example, the data generated by the IoT endpoint may be data generated by an agent of the IoT endpoint.

An agent may apply various algorithms to the data generated by the IoT endpoint to determine a result. The result may be, for example, a statistic based on the data generated by the IoT endpoint. As another example, the result may be an alarm if certain data generated by the IoT endpoint exceeds a certain threshold. The result may, for example, be provided to another agent of the IoT endpoint and/or provided back to the DI application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 8 illustrates an example snippet of a configuration file for a feature, where the snippet includes a first modified portion and a second modified portion.

DETAILED DESCRIPTION

Figure 1:
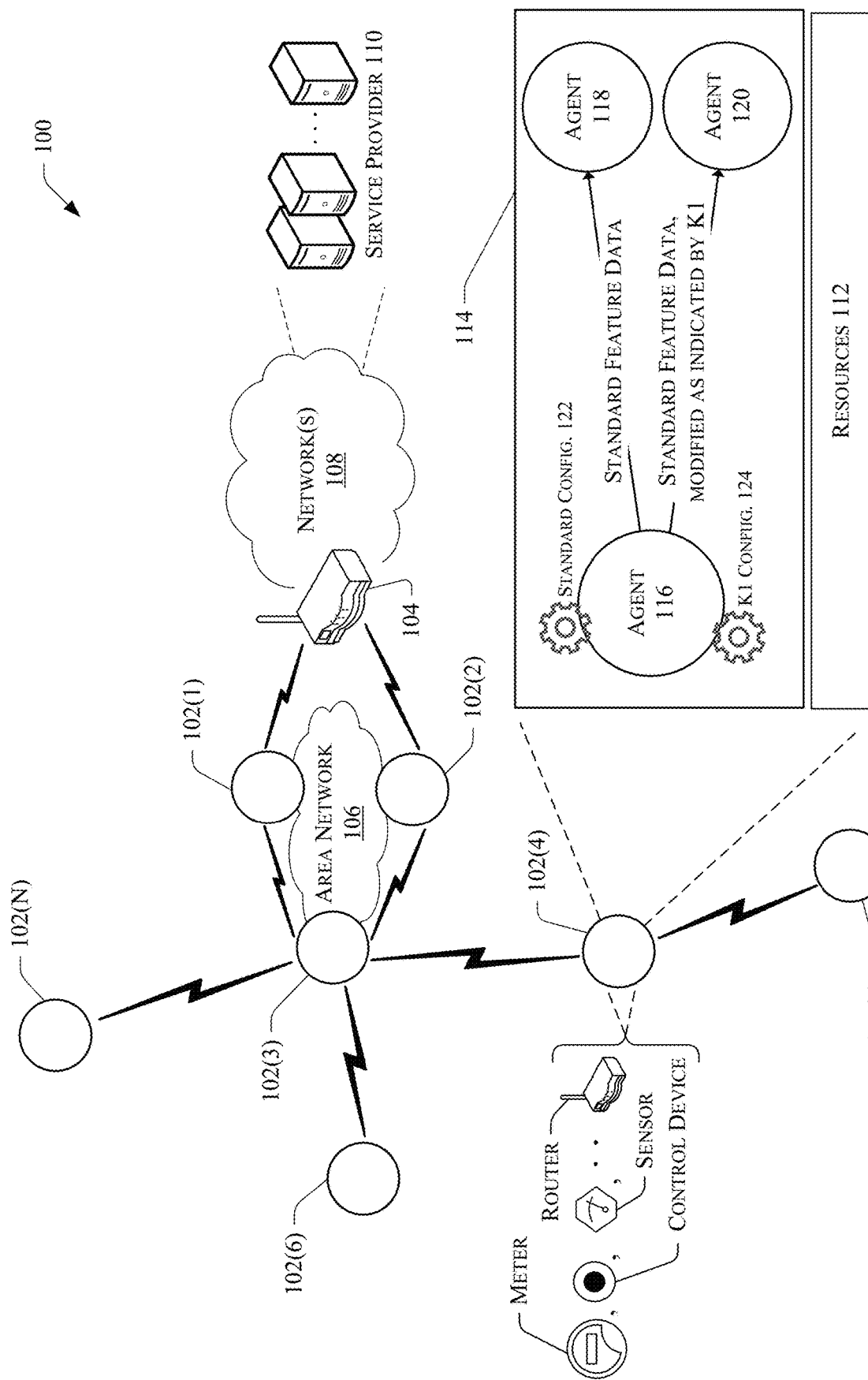
FIG. 1 is a diagram illustrating an example networked environment or architecture in which at least one network communication device includes an agent that generates standard feature data using a baseline configuration of parameters, modified as indicated by a modified configuration of parameters.

An internet of things (IoT) endpoint may be configured with an agent that generates result data based on data generated by the IoT endpoint. It may be desirable for a single agent on an IoT endpoint to efficiently generate multiple results, each from a single snapshot of real time data and using different configurations of parameters.

An agent is a, typically small, executable that is installed in a container on an IoT endpoint. An agent may include multiple features, each feature generating some outcome data. An agent may load outcome data into the IoT endpoint's database, from which the outcome data may be provided to DI applications or other agents for consumption or other use.

This disclosure describes techniques for an agent, of a distributed intelligence application, such as an application hosted in a cloud, to generate feature data for a feature based on dynamic data located at a network communication device in communication with a network. The techniques may include processing a baseline configuration of parameters, associated with the distributed intelligence application, to determine a first set of parameters. The techniques may further include processing the baseline configuration of parameters and a modified configuration of parameters to determine a second set of parameters, wherein the modified configuration of parameters is associated with the distributed intelligence application and indicates a difference from the baseline configuration of parameters. The techniques may further include processing a snapshot of the dynamic data, generated by the network communication device, according to an algorithm using the first set of parameters to determine a first result and providing the first result as first feature data for the feature, in association with a first key corresponding to the baseline configuration of parameters. The techniques may further include processing the snapshot of the dynamic data according to the algorithm using the second set of parameters to determine a second result and providing the second result as second feature data for the feature, in association with a second key corresponding to the modified configuration of parameters.

Thus, for example, a single agent algorithm may be parameterized to provide different results for different configurations of input data, where the different results are based on the same snapshot of real time data. With the parameterization, for example, network and network communication device resources, such as memory and/or network bandwidth, which may be limited, can be efficiently utilized.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein are applicable to any communications network, control network, and/or another type of network or system. In one example, the techniques may be implemented in the context of the Internet of Things (IoT).

Example Environment

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. The network communication device 104 may be considered, for example, a root node of the AN 106. For at least some purposes, the network communication device 104 may be considered a destination network node (at least an intermediate destination) for communications from the network communications devices 102.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data throughout the AN 106. Alternatively, or additionally, the AN 106 may comprise a star network, in which a central device acts as a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to generate and/or exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate according to various modulation schemes that are available to it and perform processing to determine and indicate a preferred link to use for communication. Available modulation schemes may differ by modulation type and/or by data rate.

The network communication devices 102, such as the network communication device 102(4), may comprise, for example, a utility meter and/or other sensor, a control device or a router. These are examples, and the network communication device 102 may instead or in addition comprise other functionality.

The network communication devices 102, such as the network communication device 102(4), may each include resources 112 as well as an agent container 114. At least a portion of the resources 112 and the agent container 114 may be implemented, for example, using a Linux-based processor executing instructions to cause the processor to perform particular operations. The resources 112 may include features such as firmware that, when executed by one or more processors of the network communication device 102(4), causes the one or more processors to perform operations to facilitate communication with other network communication devices 102. As another example, the resources 112 may include features of the network communication device 102 (4) such as access to data and/or control corresponding to environmental measurements or control being made by electronics of the network communication device 102(4), such as metering electricity usage, sensing electrical line voltage, controlling a switch to enable and/or disable electricity consumption by a device and/or determining communication metrics corresponding to communication with other network communication devices 102.

The agent container 114 may include one or more agents to accomplish distributed intelligence (DI) application functionality in the network communication device 102(4). An agent may, for example, be developed in C++ and the agents may execute by a processor of the network communication device 102(4) within a Linux Container (LXC). In the FIG. 1 example, the agent container 114 includes three agents— an agent 116, an agent 118 and an agent 120. Each of the agent 116, the agent 118 and the agent 120 includes code that, when executed by a processor of the network communication device 102(4), implements one or more features that comprises the DI application. A feature may perform some discrete function and/or produce some output such as calculating that electrical line voltage being measured by a sensor of the network communication device 102(4) has fallen below some threshold and raising an event. DI applications are made up of a collection of features, and a feature can be a part of more than one DI application.

In the FIG. 1 agent container 114, the agent 116 provides standard feature data to the agent 118 in correspondence with a standard configuration 122 of parameters, and the agent 116 provides the standard feature data, modified as indicated by a K1 configuration 124 of parameters, to the agent 120. For example, the standard configuration 122 of parameters may indicate one or more parameters as input to an algorithm that is being implemented by the agent 116 on a snapshot of the resources 112. The K1 configuration 124 of parameters may indicate how the one or more parameters of the standard configuration 122 of parameters are to be modified as input to the algorithm being implemented by the agent 116. Thus, for example, the standard configuration 122 of parameters may be considered a baseline configuration of parameters that may be provided as input to the algorithm that is being implemented by the agent 116, and the K1 configuration 124 of parameters may be considered as an indication of how the baseline configuration of parameters is to be modified and also provided as input to the algorithm that is being implemented by the agent 116 on the snapshot of the resources 112.

Example Network Communication Device

Figure 2:
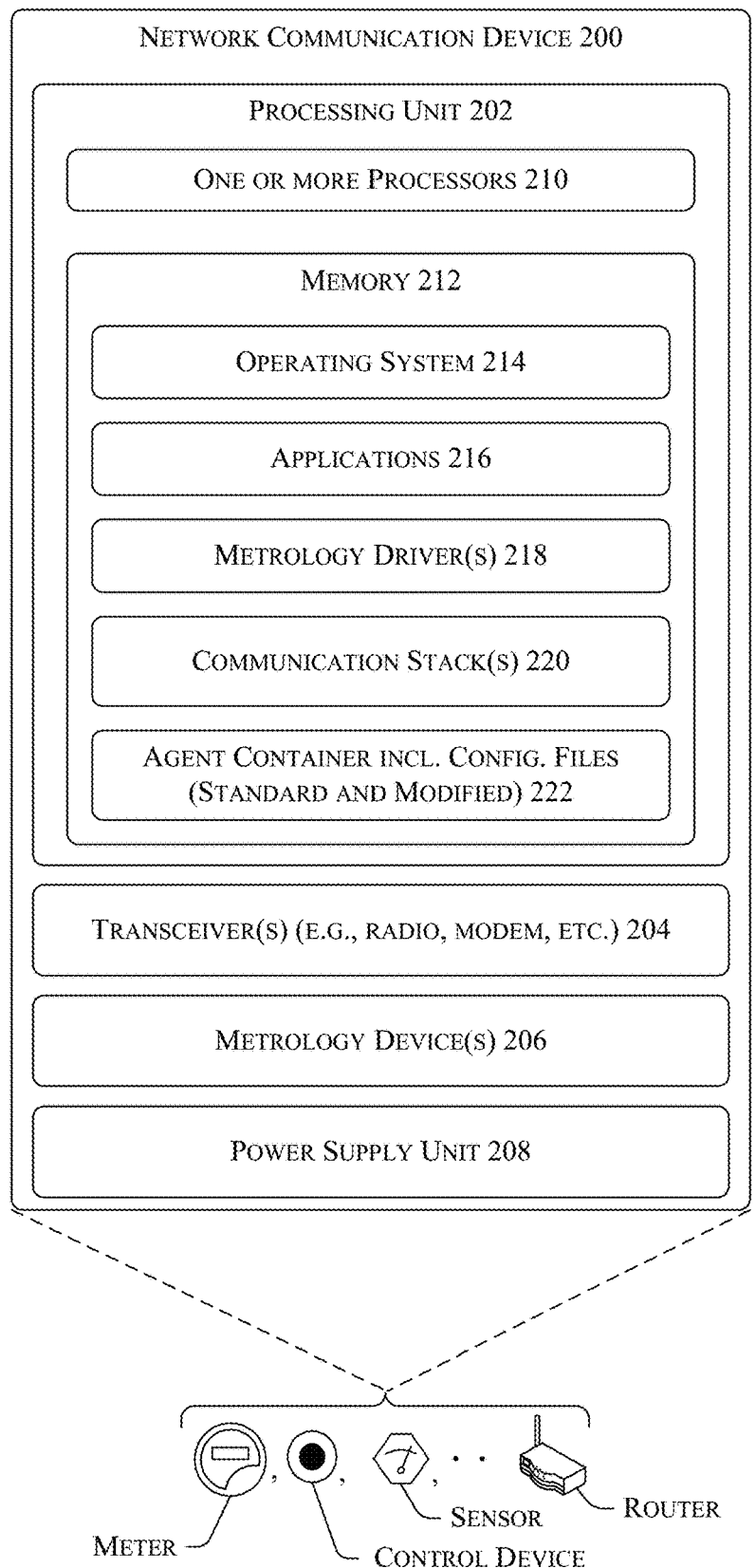
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, network node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, computer system(s) in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 may comprise a Full Function Device (FFD), while in other instances the network communication device 200 may comprise a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 may comprise physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as an FFD, the power supply unit 208 comprises a mains power connector that couples to an Alternating Current (AC) or Direct Current (DC) mains power line where the network communication device 200 is installed. In other instances, such as when the network communication device 200 is implemented as an LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 may include an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also include a portion 222 storing at least one agent container for agents (including programming instructions) that comprise DI applications. The portion 222 may also store a standard configuration of parameters according to which an agent may provide standard feature data, such as to another agent. The portion 222 may also store a modified configuration of parameters, according which the agent may provide the standard feature data, modified as indicated by the modified configuration. For example, the standard configuration of parameters may indicate one or more parameters as input to an algorithm that is being implemented by the agent on a snapshot of resources of the network communication device 200. The modified configuration of parameters may indicate how the one or more parameters of the standard configuration of parameters are to be modified as input to the algorithm being implemented by the agent. Thus, for example, the standard configuration of parameters may be considered a baseline configuration of parameters that may be provided as input to the algorithm that is being implemented by the agent, and the modified configuration of parameters may be considered as an indication of how the baseline configuration of parameters is to be modified and also provided as input to the algorithm that is being implemented by the agent 116 on the snapshot of the resources.

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Figure 3:
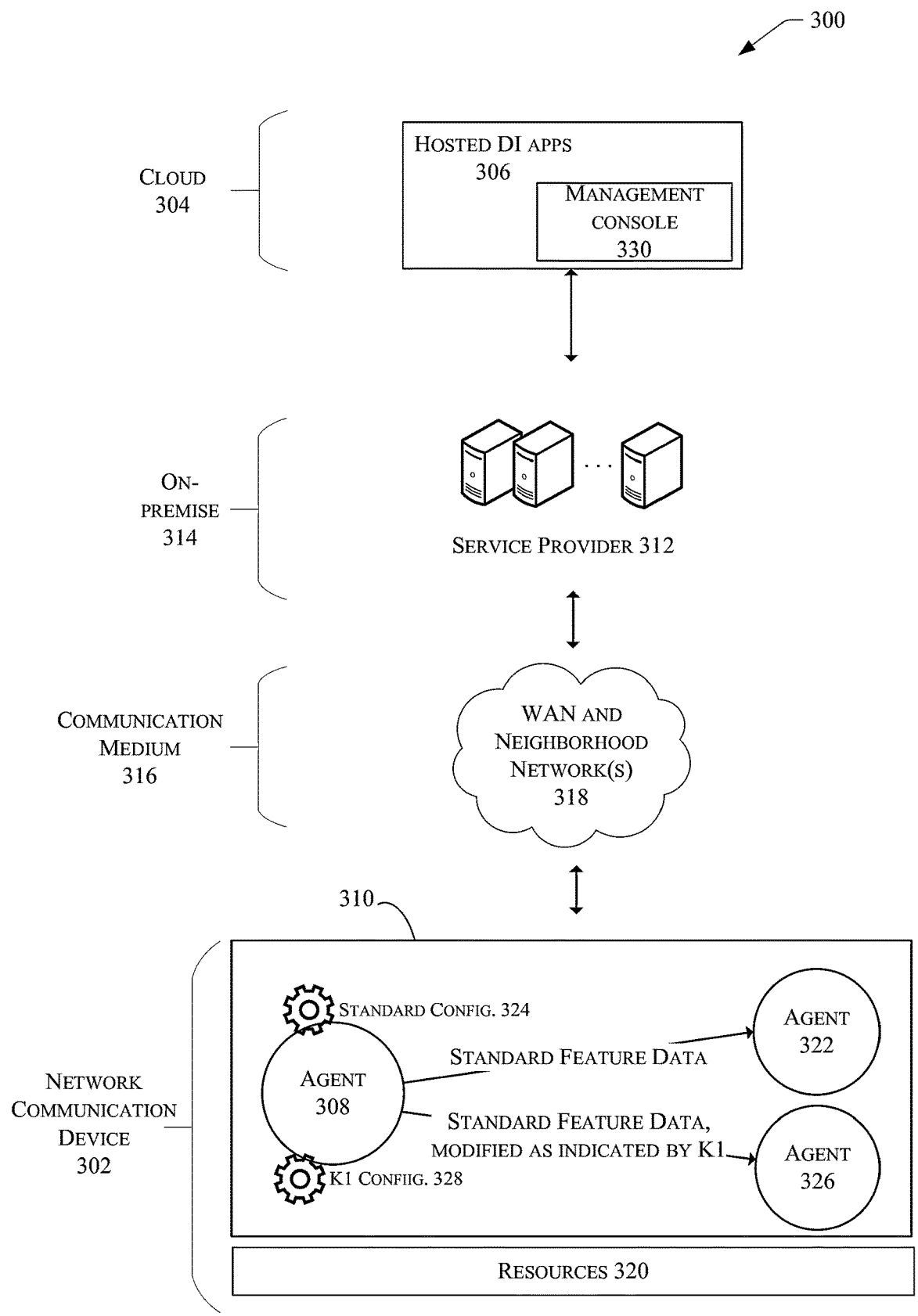
FIG. 3 is a block diagram illustrating an example system and showing the context of a network communication device, within the system including a cloud, wherein the cloud may provide a platform for hosted DI applications.

FIG. 3 is a block diagram illustrating a system 300 and showing the context of a network communication device 302, within the system 300 including a cloud 304. For example, the cloud 304 may provide a platform for hosted DI applications 306, such as analytics applications and/or applications for network configuration and/or communication. The hosted DI applications 306 in the cloud 304 may include, for example, applications for electrical grid optimization, applications for electricity consumer transformation, and applications for distributed energy resources integration. The hosted DI applications 306 in the cloud 304 may interface with one or more agents, such as the agent 308 in an agent container 310 of the network communication device 302 and possibly also with other network communication devices.

For example, the hosted DI applications 306, residing at least partly in the cloud 304, may interact with the agent 308 via the service provider 312 (which may be physically located on-premise 314 of a utility or other enterprise) and via a communication medium 316 that may include, for example, a WAN and/or neighborhood networks 318. The service provider 312 may include, for example, a client proxy service that operates as described in RFC 7252, "The Constrained Application Protocol (CoAP)," dated June 2014 and as described in RFC 7641, "Observing Resources in the Constrained Application Protocol (CoAP)," dated September 2015. The client proxy service may expose to the hosted DI applications 306 a forward proxy for read/write access to network communication endpoints, including the network communication device 302. The service provider 312 may also include a security manager that enables secure communications and data privacy between endpoints and authorized data collection systems in the system 300. In some examples, the hosted DI applications 306 may communicate with the agent 308 via the communication medium 316 without going through the service provider 312.

Similar to that shown in FIG. 1, the network communication device 302 may include resources 320. The agent 308 may provide standard feature data to an agent 322 in correspondence with a standard configuration 324 of parameters, and the agent 308 may provide the standard feature data, modified as indicated by a K1 configuration 328 of parameters, to an agent 326. For example, the standard configuration 324 of parameters may indicate one or more parameters as input to an algorithm that is being implemented by the agent 308 on a snapshot of the resources 320. The K1 configuration 328 of parameters may indicate how the one or more parameters of the standard configuration 324 are to be modified as input to the algorithm being implemented by the agent 308. Thus, for example, the standard configuration 324 of parameters may be considered a baseline configuration of parameters that may be provided as input to the algorithm that is being implemented by the agent 308, and the K1 configuration 328 of parameters may be considered as an indication of how the baseline configuration of parameters is to be modified and also provided as input to the algorithm that is being implemented by the agent 308 on the snapshot of the resources 320. The hosted DI applications 306 may include a management console 330 via which an administrator and/or other user may cause the standard configuration 324 of parameters and the K1 configuration 328 of parameters to be provided to the agent container 310.

Figure 4:
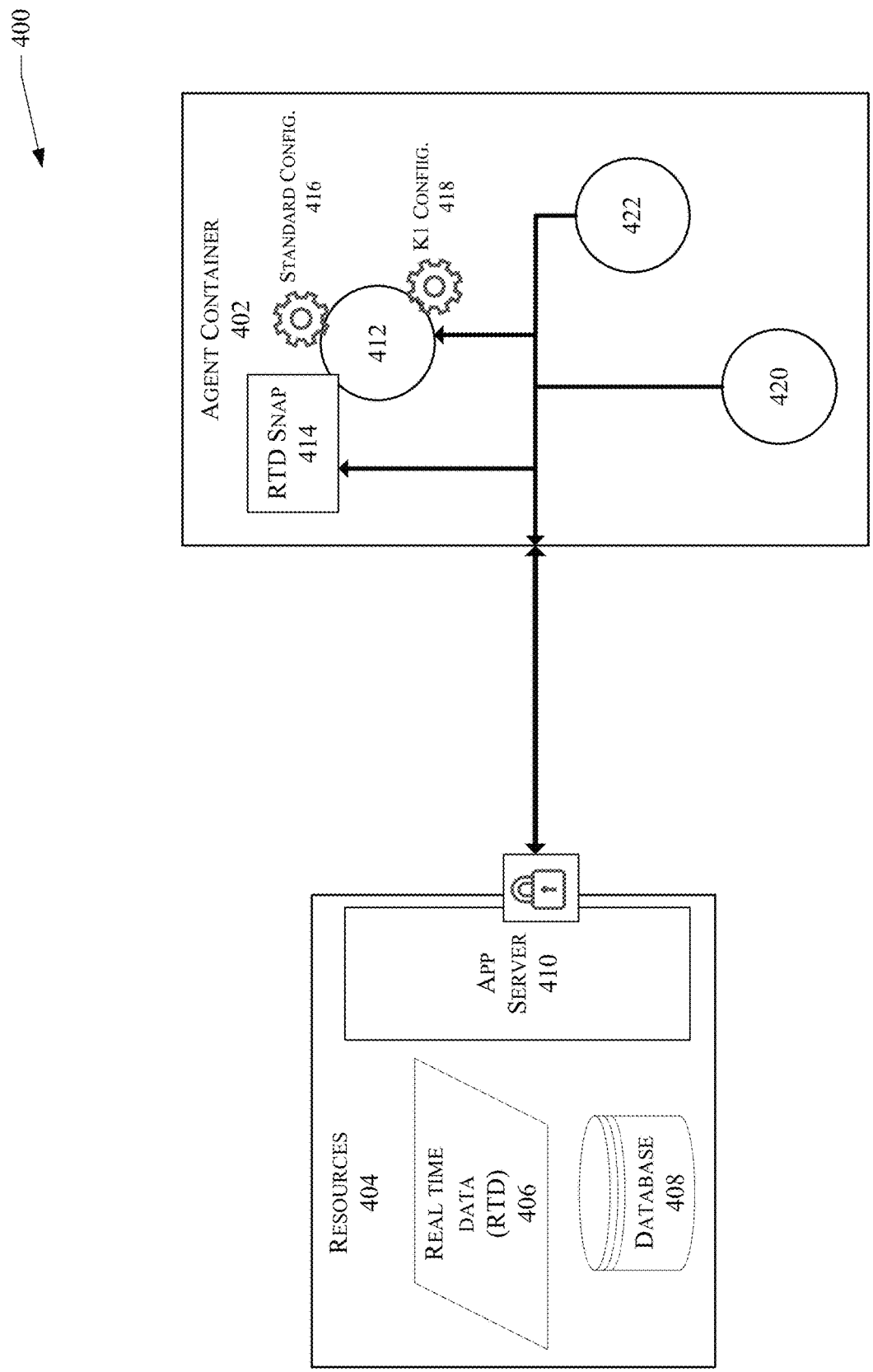
FIG. 4 is a block diagram illustrating how an example agent container of a network communication device may interoperate with resources of the network communication device.

FIG. 4 is a block diagram of a network communication device 400 illustrating how an agent container 402 may interoperate with resources 404 of the network communication device 400. The resources 404 may include, for example, real time data (RTD) 406 and a database 408. The real time data may include, for example, metrology data, signal data, and/or a state of one or more load control switches 410. These are examples, and some network communication devices may have different real time data. The real time data 406 may be generated at the network communication device 400 and/or received by the network communication device 400. The database 408 may, for example, hold result data received from the agent container 402. An application server 410 may regulate access by the agent container 402 to the resources 404, including to the RTD 406 and to the database 408.

The agent container 402 includes an agent 412. The agent 412 operates on data of an RTD snapshot 414, which is a portion of the RTD 406 at some instant (snapshot) in time. More particularly, the agent 412 generates a first feature outcome based at least in part on the data of the RTD snapshot 414 by applying an algorithm using parameters indicated by a standard configuration 416 of parameters. In addition, the agent generates a second feature outcome based at least in part on data of the RTD snapshot 414 by applying the algorithm using parameters indicated by a K1 configuration 418 of parameters. The standard configuration 416 of parameters may be considered a baseline configuration of parameters that may be provided as input to the algorithm that is being implemented by the agent 412 on the RTD snapshot 414, and the K1 configuration 418 of parameters may be considered as an indication of how the baseline configuration of parameters is to be modified and also provided as input to the algorithm that is being implemented by the agent 412 on the RTD snapshot 414.

FIG. 1 and FIG. 3 show feature outcome data being provided directly from the agent that produces the feature outcome data to an agent that consumes the feature outcome data. For example, FIG. 1 shows feature outcome data being provided directly from the agent 116 to the agent 118 and directly from the agent 116 to the agent 120. FIG. 3 shows feature outcome data being provided directly from the agent 308 to the agent 322 and directly from the agent 308 to the agent 326. In some examples, the feature outcome data is provided to a database from an agent that produces the feature outcome data, and the agent that consumes the feature outcome data obtains the feature outcome data from the database. For example, with reference to FIG. 4, the agent 412 may provide the first feature outcome data, based on the standard configuration 416 of parameters, to the database 408, and the agent 412 may also provide the second feature outcome data, based on the K1 configuration 418 of parameters, to the database 408. The agent 420 may obtain the first feature outcome data from the database 408, and the agent 422 may obtain the second feature outcome data from the database 408.

Figure 5:
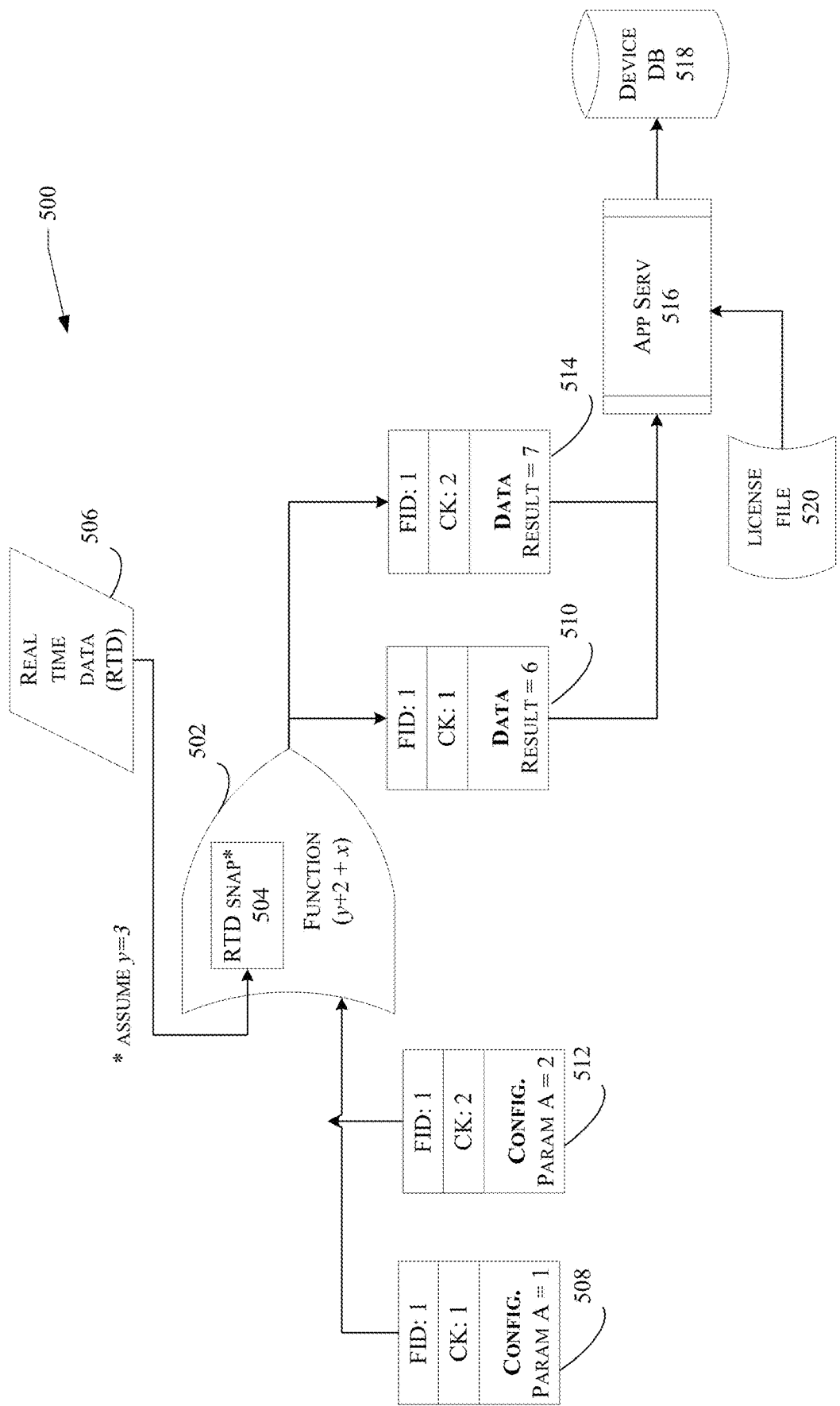
FIG. 5 is a diagram conceptually illustrating how an example network communication device may operate on a baseline configuration of parameters and on a modified configuration of parameters.

FIG. 5 is a diagram conceptually illustrating how a network communication device 500 may operate on a baseline configuration of parameters and on a modified configuration of parameters. Referring to FIG. 5, an algorithm 502 (that is an algorithm of an agent being executed by one or more processors of the network communication device) comprises the function "y+2+x." In some examples, the algorithm may be much more complex. The algorithm 502 operates in part on RTD snapshot 504, of which a value for the "y" variable is a part. The RTD snapshot 504 is indicative of a snapshot in time of the RTD 506. For the purpose of illustration, the "y" variable is assumed to have the value of 3 though the "y" variable in the RTD 506 may typically change over time.

The algorithm 502 operates on a baseline configuration 508 of parameters and on the RTD snapshot 504 to determine a first feature data 510. Each of the baseline configuration 508 of parameters and the first feature data 510 has associated with it a feature ID (FID) and a configuration key (CK). The FID and CK associated with the baseline configuration 508 of parameters matches the FID and CK associated with the first feature data 510. The CK indicates an identification of input to the algorithm, whereas the FID is in some sense an identification of the algorithm 502 itself. In the FIG. 5 examples, CK being 1 indicates the baseline configuration of parameters.

The algorithm 502 also, in a separate iteration of the algorithm 502, operates on the modified configuration 512 of parameters and on the RTD snapshot 504, to determine a second feature data 514. The modified configuration 512 of parameters has associated with it the same FID of 1, and has associated with it the CK that is associated with the second feature data 514. As with the baseline configuration 508 of parameters and the first feature data 510, the FID is equal to 1, since the FID being equal to 1 identifies the feature of the algorithm 502. The CK associated with the modified configuration 512 of parameters and the second feature data 514 is equal to 2, as distinguished from the CK associated with the baseline.

Referring again to the baseline configuration 508 of parameters, the parameter A is equal to 1. The parameter A corresponds to the "x" variable in the function of the algorithm 502. The first feature data 510 indicates that a result of the algorithm 502—with "x" being set to the value 1 as of the parameter A as indicated in the baseline configuration 508 of parameters and using the RTD snapshot 504 in which "y" is equal to the value of 3—is 6. Referring again to the modified configuration 512 of parameters, the parameter A is equal to 2. The second feature data 514 indicates that a result of the algorithm 502—with "x" being set to the value of 2 as of the parameter A as indicated in the modified configuration 512 of parameters and using the RTD snapshot 504 in which "y" is equal to 3—is 7.

After or as the first feature data 510 and the second feature data 514 are determined, the agent of which the algorithm 502 is a part provides the first feature data 510 and the second feature data 514 to an App Server 516 for storage into a device database 518. A license file 520 may also be provided. The license file 520 may include an indication to the App Server 516 which CKs are licensed (e.g., a licensor and/or other user of the hosted DI application has paid to be able to utilize a feature result for the CK) and, therefore, a feature associated with a licensed CK is allowed to be stored in the device database 518 for passage to DI applications, such as DI applications hosted in the cloud.

Figure 6:
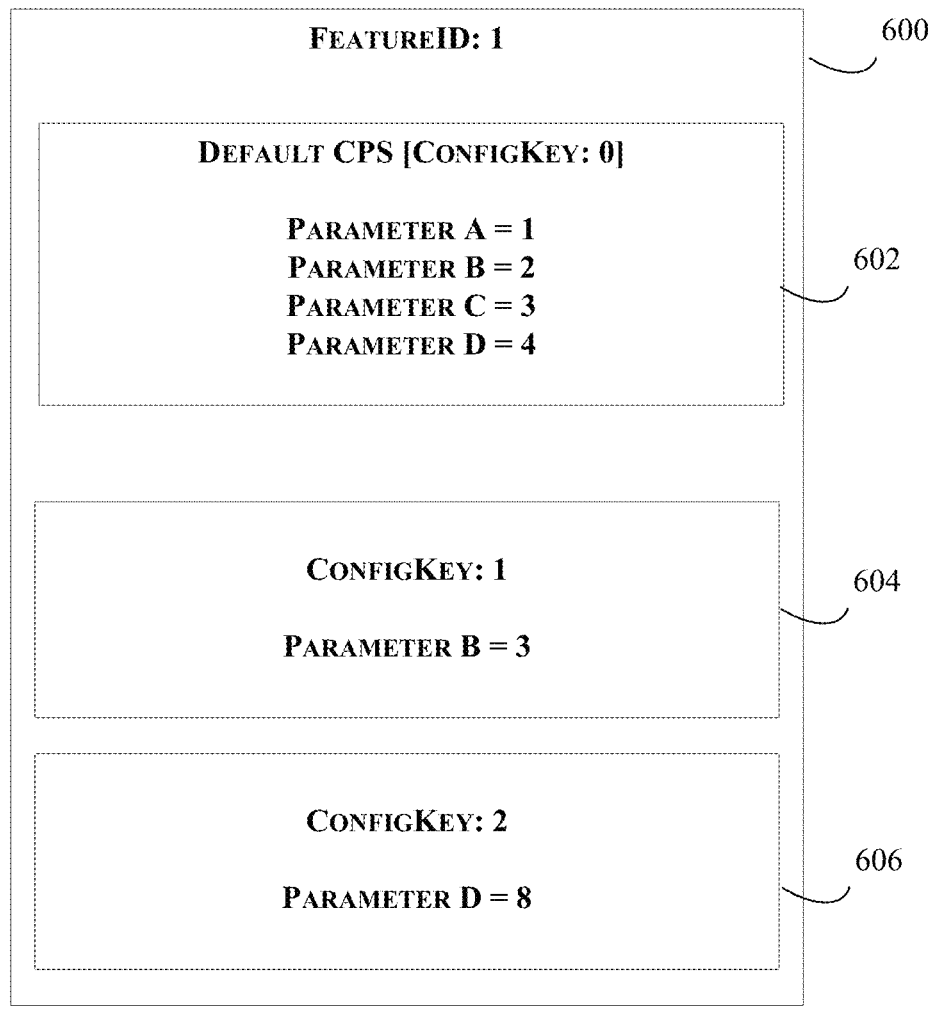
FIG. 6 is a diagram showing an example configuration of parameters including a baseline configuration of parameters, a first modified configuration of parameters and a second modified configuration of parameters.

FIG. 6 is a diagram showing an example configuration 600 of parameters including a baseline configuration 602 of parameters, a first modified configuration 604 of parameters and a second modified configuration 606 of parameters. The streamlined design of the configuration 600 of parameters provides for efficient storage of the configuration 600 of parameters as well as for efficient usage of the transmission media in communicating the configuration 600 of parameters.

The baseline configuration 602 of parameters, designated in FIG. 6 by CK of 0, includes an indication of a value for all the parameters to be applied by a particular algorithm. For the baseline configuration 602 of parameters, this includes an indication of a value for the Parameter A, for the Parameter B, for the Parameter C and for the Parameter D. Meanwhile, the first modified configuration 604 of parameters, designated by CK of 1, includes explicitly only an indication of a value for the Parameter B. This implies that the value for the Parameter A, for the Parameter C and for the Parameter D for the first modified configuration 604 of parameters is the same as the value for the Parameter A, for the Parameter C and for the Parameter D for the baseline configuration 602 of parameters.

Similarly, the second modified configuration 606 of parameters, designated by CK of 2, includes explicitly only an indication of a value for the Parameter D. This implies that the value for the Parameter A, for the Parameter B and for the Parameter C for the second modified configuration 606 of parameters is the same as the value for the Parameter A, for the Parameter B and for the Parameter C for the baseline configuration 602 of parameters.

Each of the first modified configuration 604 of parameters and the second modified configuration 606 of parameters explicitly indicates a value for one parameter, while implicitly (with reference to the baseline configuration 602 of parameters) indicating a value for three other parameters. Therefore, according to the FIG. 6 example configuration 600 of parameters, less storage is used to store the first modified configuration 604 of parameters and the second modified configuration 606 of parameters than if the first modified configuration 604 of parameters and the second modified configuration 606 of parameters indicated an indication for all four parameters similar to that included in the baseline configuration 602 of parameters. In addition, less communication bandwidth is used to communicate the first modified configuration 604 of parameters and the second modified configuration 606 of parameters than if the first modified configuration 604 of parameters and the second modified configuration 606 of parameters included an indication for all four parameters similar to that included in the baseline configuration 602 of parameters.

Figure 7:
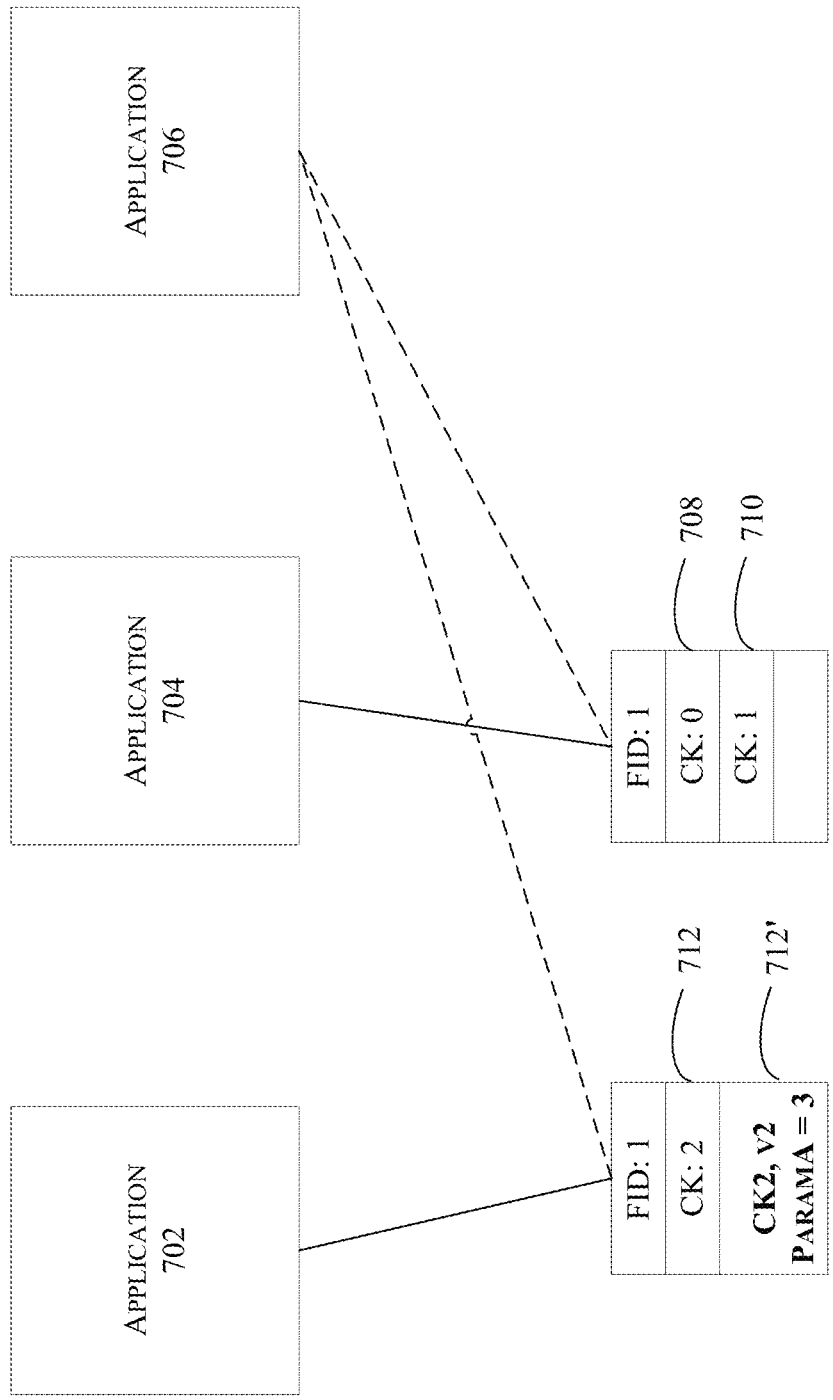
FIG. 7 is a diagram showing how different example DI applications may share features and configurations of parameters.

FIG. 7 is a diagram showing how different DI applications may share features and configurations of parameters. FIG. 7 illustrates three DI applications—a first application 702, a second application 704 and a third application 706. The first application 702, the second application 704 and the third application 706 all share a feature indicated by FID of 1. The first application 702 and the second application 704 may both be initially mapped to a default or baseline configuration 708 of parameters for the shared feature, indicated by CK of 0. In an example, the second application 704 makes a change relative to the baseline configuration 708 of parameters, and a first modified configuration 710 of parameters is generated, with a CK of 1, for use by the second application 704. For example, the change may be in response to a command and/or user input provided via a DI application management console located in the cloud.

The first application 702 may then make a subsequent change to the baseline configuration 708 of parameters, and a second modified configuration 712 of parameters is generated, with a CK of 2. The first application 702 may make yet another subsequent change, and the CK of 2 is incremented by version, to CK2, v2, for a revised second modified configuration 712' of parameters, since only the first application 702 had been mapped to use the second modified configuration 712 of parameters. The third application 706 may then be mapped to use either the baseline configuration 708 of parameters, the first modified configuration 710 of parameters, the second modified configuration 712 of parameters or the revised second modified configuration 712' of parameters.

The applications can be mapped directly to configuration keys (CKs), which may be more efficient than mapping from an application to an agent, for which the agent may be using any of a number of available configurations of parameters. A DI configuration may include a set of permissions against the configurable variables. The variables may exist in levels of a hierarchy, such as "Default," "Utility" (where, for example, the DI application is being executed by or on behalf of a utility), "Data Science" and "endpoint-specific." For example, the "Default" level may be a baseline configuration for a corresponding agent/feature, which is loaded onto all IoT endpoints that include the agent/feature. A subset of variables may be contained within the "Utility" and "Data Science" levels. These variables may be the only variables Utilities or Data Scientists may access. A utility, for example, may only be able to modify thresholds for alarms, whereas Data Scientists may be able to modify variables used within algorithms to determine environmental events. The endpoint-specific level may include configuration changes that are specific to individual installed IoT endpoints.

FIG. 8 illustrates an example snippet 800 of a configuration file for a feature having an FID of 50528256. The configuration file is provided in an extensible markup language (XML) format. The snippet 800 includes a first portion 802, for a value of CK equal to 1, and the snippet 800 includes a second portion 804, for a value of CK equal to 2. Each of the first portion 802 and the second portion 804 indicates a difference from a baseline configuration of parameters, not shown in FIG. 8 Thus, for example, to help reduce complexity throughout the system, a new portion, with a new ConfigKey indication (e.g., incremented by one from a previous ConfigKey indication) may be pre-pended to any existing FeatureID when parameter configurations for a FeatureID are created, such as within functionality in the cloud. This may allow for masking the new ConfigKey indication to determine the affected FeatureID, and therefore to determine which network communication devices are to receive the configuration. For example, this may include determining that network communication devices that include an agent for the feature are to receive the configuration. Once a network communication device receives the configuration, the network communication device can use the ConfigKey to determine the parameters to input to an algorithm of the agent for the feature, by determining a difference (e.g., adding or modifying) from the baseline configuration of parameters for the feature. A configuration management tool may be used in conjunction with the configuration hierarchy to enable specific modifications within individual configuration levels. This may be useful for Data Science and/or endpoint-specific levels. For example, a group of endpoint-specific configurations may be additionally modified to accommodate environmental conditions around each of the IoT endpoints. This may be accomplished with one or more ConfigKeys within the endpoint-specific level. In some examples, a group of IoT endpoints may be configured to all use the same ConfigKey Set. This may make the management and application of ConfigKey sets easier, both from a service provider and management perspective.

Figure 9:
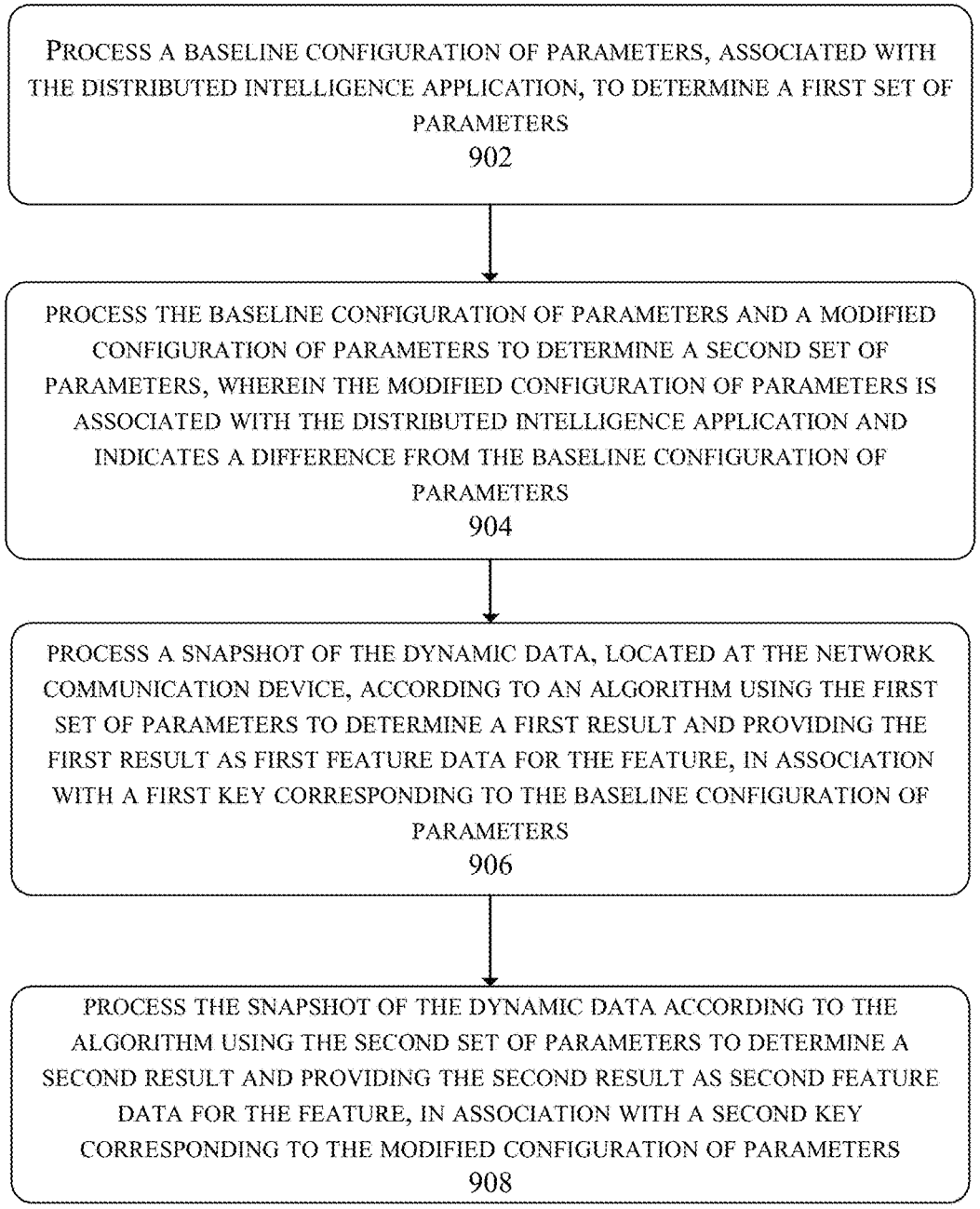
FIG. 9 is a flowchart illustrating an example agent process, to generate feature data for a feature based on dynamic real time data generated at a network communication device in communication with a cloud via at least one network, using a baseline configuration of parameters and a modified configuration of parameters.

FIG. 9 is a flowchart illustrating an example agent process 900, to generate feature data for a feature based on dynamic data generated at a network communication device in communication with a network. The agent is an agent of a distributed intelligence application hosted in the cloud. The process 900 (as well as each process described herein) is illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Referring to FIG. 9, at 902, the agent processes a baseline configuration of parameters, associated with the distributed intelligence application, to determine a first set of parameters. For example, referring back to FIG. 6, the baseline configuration of parameters may be the default CPS, indicated by ConfigKey of 0. At 904, the agent processes the baseline configuration of parameters and a modified configuration of parameters to determine a second set of parameters. The modified configuration of parameters is associated with the distributed intelligence application and indicates a difference from the baseline configuration of parameters. For example, the modified configuration of parameters 604 may be the set of parameters indicated by the ConfigKey of 1 or may be the set of parameters indicated by the ConfigKey of 2.

At 906, the agent processes a snapshot of the dynamic data, generated by the network communication device, according to an algorithm using the first set of parameters to determine a first result and providing the first result as first feature data for the feature, in association with a first key corresponding to the baseline configuration of parameters. At 908, the agent processes the snapshot of the dynamic data according to the algorithm using the second set of parameters to determine a second result and providing the second result as second feature data for the feature, in association with a second key corresponding to the modified configuration of parameters.

Thus, for example, a single agent algorithm may be parameterized to provide different results for different configurations of input data, where the different results are based on the same snapshot of real time data. With the parameterization, for example, network communication device resources, which may be limited, can be efficiently utilized.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to customize operation of a feature, comprising:
   inputting dynamic data into an algorithm of the feature;
   processing, by operation of the feature, the dynamic data using a baseline configuration of parameters controlling aspects of the algorithm of the feature, to determine a first set of feature data, wherein the first set of feature data is first output data from the feature and is based in part on the baseline configuration of parameters, and wherein the baseline configuration of parameters is determined by use of a first configuration key;
sending the first set of feature data to a first data receiver;
processing the baseline configuration of parameters according to a modified configuration of parameters to determine a second set of parameters, wherein the modified configuration of parameters is indicated by a second configuration key;
processing, by operation of the feature, the dynamic data using the second set of parameters to control the aspects of the algorithm of the feature, to determine a second set of feature data, wherein the second set of feature data is second output data from the feature and is based in part on the modified configuration of parameters, and wherein the modified configuration of parameters is determined by use of the second configuration key; and
sending the second set of feature data to a second data receiver, wherein the first data receiver and the second data receiver are different, and wherein the first set of feature data and the second set of feature data are different.

2. The method of claim 1, wherein the second configuration key contains information to modify the baseline configuration of parameters that are based on the first configuration key.

3. The method of claim 1, wherein at least one of the baseline configuration of parameters associated with the first configuration key or the modified configuration of parameters associated with the second configuration key is configured to increase network communication device efficiency.

4. The method of claim 1, wherein the feature is defined in a memory device of an electricity meter and configured to operate a network communications device of the electricity meter.

5. The method of claim 1, wherein the feature is one of a plurality of features utilized by a first distributed intelligence application, and wherein the feature is also utilized by a second distributed intelligence application.

6. The method of claim 1, wherein the feature is defined in a memory device of an electricity meter, and wherein the feature is one of a plurality of features utilized by a first distributed intelligence application.

7. The method of claim 1, wherein:
the baseline configuration of parameters is indicated by the first configuration key;
the second set of parameters is a modification of the baseline configuration of parameters by the second configuration key;
a third set of parameters is a modification of the second set of parameters by a third configuration key; and
the method additionally comprises:
processing, by operation of the feature, third dynamic data using the third set of parameters to control the aspects of the algorithm of the feature, and to determine a third set of feature data.

8. The method of claim 1, additionally comprising:
calculating a configuration of parameters by modifying the baseline configuration of parameters in a sequential manner, by actions comprising:
modifying the baseline configuration of parameters, using the second configuration key, to obtain the second set of parameters; and
modifying the second set of parameters, using a third configuration key, to obtain a third set of parameters.

9. The method of claim 1, additionally comprising:
deriving the baseline configuration of parameters using the first configuration key;
modifying the baseline configuration of parameters to obtain the second set of parameters using the second configuration key; and
modifying the second set of parameters to obtain a third set of parameters using a third configuration key; and
processing, by operation of the feature, data according to each of:
the baseline configuration of parameters;
the second set of parameters; and
the third set of parameters.

10. A network communication device configured to communicate with a network, comprising:
one or more processors; and
a memory device coupled to the one or more processors, wherein the memory device stores instructions executable by the one or more processors to perform operations of an agent, of a distributed intelligence application, to generate feature data for a feature based on dynamic data located at the network communication device, the operations comprising:
inputting dynamic data into an algorithm of the feature;
processing, by operation of the feature, the dynamic data using a baseline configuration of parameters controlling aspects of the algorithm of the feature, to determine a first set of feature data, wherein the first set of feature data is first output data from the feature and is based in part on the baseline configuration of parameters, and wherein the baseline configuration of parameters is determined by use of a first configuration key;
sending the first set of feature data to a first data receiver;
processing the baseline configuration of parameters according to a modified configuration of parameters to determine a second set of parameters, wherein the modified configuration of parameters is indicated by a second configuration key;
processing, by operation of the feature, the dynamic data using the second set of parameters to control the aspects of the algorithm of the feature, to determine a second set of feature data, wherein the second set of feature data is second output data from the feature and is based in part on the modified configuration of parameters, and wherein the modified configuration of parameters is determined by use of the second configuration key; and
sending the second set of feature data to a second data receiver, wherein the first data receiver and the second data receiver are different, and wherein the first set of feature data and the second set of feature data are different.

11. The network communication device of claim 10, wherein the second configuration key contains information to modify the baseline configuration of parameters that are based on the first configuration key.

12. The network communication device of claim 10, wherein at least one of the baseline configuration of parameters associated with the first configuration key and the modified configuration of parameters associated with the second configuration key is configured to increase network communication device efficiency.

13. The network communication device of claim 10, wherein the feature is defined in the memory device, wherein the memory device is within an electricity meter, and wherein the feature is configured to operate a communications device of the electricity meter.

14. The network communication device of claim 10, wherein the feature is one of a plurality of features utilized by a first distributed intelligence application, and wherein the feature is also utilized by a second distributed intelligence application.

15. The network communication device of claim 10, wherein the baseline configuration of parameters and the modified configuration of parameters are defined in a configuration file having an extensible markup language (XML) format.

16. One or more computer-readable storage media storing computer-readable instructions that, when executed, instruct one or more processors of a network communication device in a network to perform operations comprising:

inputting dynamic data into an algorithm of a feature;

processing, by operation of the feature, the dynamic data using a baseline configuration of parameters controlling aspects of the algorithm of the feature, to determine a first set of feature data, wherein the first set of feature data is first output data from the feature and is based in part on the baseline configuration of parameters, and wherein the baseline configuration of parameters is determined by use of a first configuration key;

sending the first set of feature data to a first data receiver;

processing the baseline configuration of parameters according to a modified configuration of parameters to determine a second set of parameters, wherein a second configuration key contains information to modify the baseline configuration of parameters that are based on the first configuration key;

processing, by operation of the feature, the dynamic data using the second set of parameters to control the aspects of the algorithm of the feature, to determine a second set of feature data, wherein the second set of feature data is second output data from the feature and is based in part on the modified configuration of parameters, and wherein the modified configuration of parameters is determined by use of the second configuration key; and sending the second set of feature data to a second data receiver, wherein the first data receiver and the second data receiver are different, and wherein the first set of feature data and the second set of feature data are different.

17. The one or more computer-readable storage media storing computer-readable instructions of claim 16, wherein the second configuration key contains information to modify the baseline configuration of parameters that are based on the first configuration key.

18. The one or more computer-readable storage media storing computer-readable instructions of claim 16, wherein at least one of the baseline configuration of parameters associated with the first configuration key or the modified configuration of parameters associated with the second configuration key is configured to increase network communication device efficiency.

19. The one or more computer-readable storage media storing computer-readable instructions of claim 16, wherein the feature is one of a plurality of features utilized by a first distributed intelligence application, and wherein the feature is also utilized by a second distributed intelligence application.

20. The one or more computer-readable storage media storing computer-readable instructions of claim 16, wherein the feature is defined in a memory device of an electricity meter, and wherein the feature is one of a plurality of features utilized by a first distributed intelligence application.

* * * * *